United States Patent [19]
Miyazaki

[11] Patent Number: 5,909,756
[45] Date of Patent: Jun. 8, 1999

[54] PNEUMATIC TIRE INCLUDING SUB-GROOVES

[75] Inventor: Tatsuya Miyazaki, Akashi, Japan

[73] Assignee: Sumitomo Rubber Industries, Ltd., Hyogo-ken, Japan

[21] Appl. No.: 08/931,755

[22] Filed: Sep. 16, 1997

[30] Foreign Application Priority Data

Sep. 16, 1996 [JP] Japan ................................ 8-248176

[51] Int. Cl.⁶ ........................... B60C 11/11; B60C 11/12; B60C 11/13
[52] U.S. Cl. ................................ 152/209 R; 152/DIG. 3
[58] Field of Search .................... 152/209 R, 209 D, 152/DIG. 3, 209 A

[56] References Cited

U.S. PATENT DOCUMENTS

| | | | |
|---|---|---|---|
| 3,789,898 | 2/1974 | Montagne | 152/209 R |
| 4,258,769 | 3/1981 | Makino et al. | 152/209 R |
| 4,296,789 | 10/1981 | Roberts et al. | 152/209 R |

FOREIGN PATENT DOCUMENTS

| | | | |
|---|---|---|---|
| 2084741 | 6/1993 | Canada | 152/209 R |
| 348335 | 12/1989 | European Pat. Off. | 152/209 R |

*Primary Examiner*—Steven D. Maki

[57] ABSTRACT

A pneumatic tire comprises a tread portion divided into at least three land portions by at least two circumferential main grooves, and at least one of the three land portions is provided with sub-grooves being shallower in depth than the main grooves and having a width in the range of from 0.05 to 0.60 times the width of the main grooves. The sub-grooves comprises axial sub-grooves extending across the land portion and a circumferential sub-groove extending continuously in the circumferential direction of the tire. The circumferential sub-groove is provided in the bottom with a circumferential sipe extending continuously in the circumferential direction of the tire. Each of the axial sub-grooves is provided in the groove bottom on each side of the circumferential sub-groove with an axial sipe extending along the longitudinal direction thereof. The axial sipe has a first end on the circumferential sub-groove side and a second end on another side, the first end not intersecting the circumferential sipe and closed within the groove bottom, and the second end preferably closed within the groove bottom.

11 Claims, 6 Drawing Sheets

FIG.5
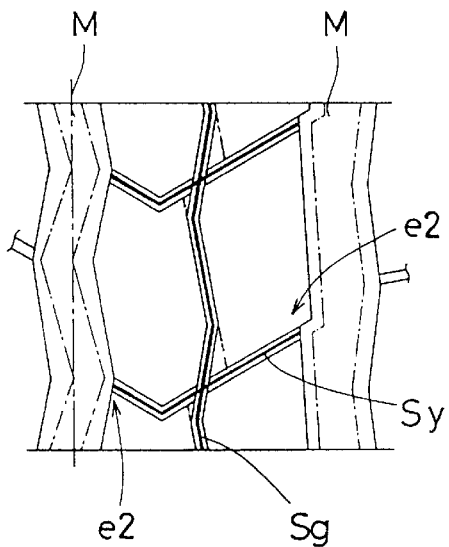
Pattern(A)
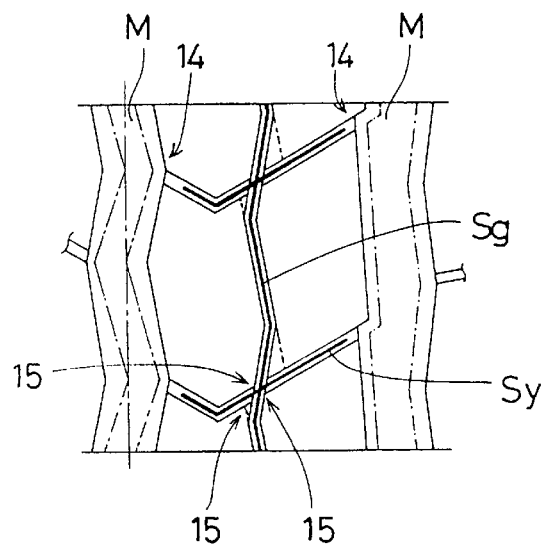
Pattern(B)
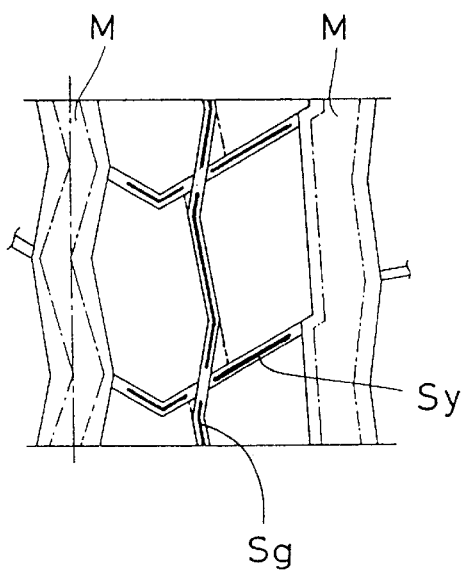
Pattern(C)
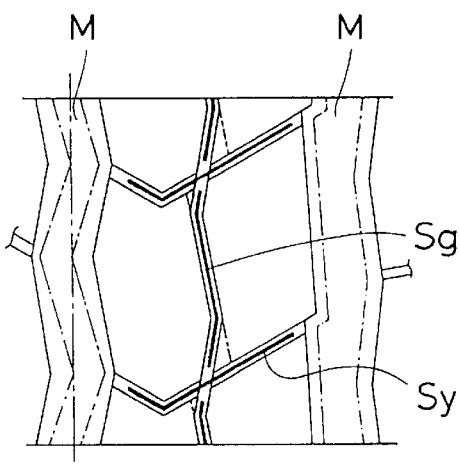
Pattern(D)

5,909,756

PNEUMATIC TIRE INCLUDING SUB-GROOVES

FIELD OF THE INVENTION

The present invention relates to a pneumatic tire having an improved tread portion.

DESCRIPTION OF RELATED ART

In heavy duty vehicles such as trucks, buses and the like, so called all-weather tires have been preferred recently. In general, to improve on-the-snow/ice performance, on snow and ice the tread portion of an all-weather tire is divided into blocks which are structurally weak in comparison with a rib. Thus, the tire suffers from uneven wear such as heel-and-toe wear during running.

In the published Japanese application No. JP-B2-57-9967, a heavy duty tire is disclosed, wherein, to increase the resistance of the tread blocks, to uneven wear each axial groove between the blocks is partially provided with platforms. Each platform protrudes from one of the groove sidewalls, with a small distance from the opposite platform. This means, however, that one can not fully control the movement of the blocks during running, and thus uneven wear can not be effectively decreased.

SUMMARY OF THE PRESENT INVENTION

It is therefore, an object of the present invention to provide a pneumatic tire in which uneven wear is effectively prevented without sacrificing other performance such as performance on snow and ice and and the resistance to cracking and rubber tearing-off.

According to one aspect of the present invention, a pneumatic tire comprises a tread portion provided with at least two main grooves extending circumferentially about the tire to axially divide the tread portion into three circumferential land portions, At least one of the three land portions is provided with sub-grooves shallower in depth than the main grooves.

The sub-grooves have a width in the range of from 0.05 to 0.60 times the width of the main grooves.

The sub-grooves comprising axial sub-grooves extending across the at least one land portion and a circumferential sub-groove extending continuously in the circumferential direction of the tire.

The circumferential sub-groove provided at the bottom thereof with a circumferential sipe extending continuously in the circumferential direction of the tire.

Each of the axial sub-grooves is provided at the groove bottom on each side of the circumferential sub-groove with an axial sipe extending along the longitudinal direction thereof.

The axial sipe has a first end on the circumferential sub-groove side and a second end on another side.

The first end of the axial sipe does not intersect the circumferential sipe and is closed within the groove bottom.

Preferably, the second end of the axial sipe is closed within the groove bottom.

BRIEF DESCRIPTION OF THE DRAWINGS

Embodiments of the present invention will now be described in detail in conjunction with the accompanying drawings.

FIGS. 5(A) to 5(D) show tread patterns (A) to (D) used in comparison tests as of Ref. tires 1 to 4, respectively.

DETAILED DESCRIPTION OF THE PREFERRED EMBODIMENT(S)

Figure 1:
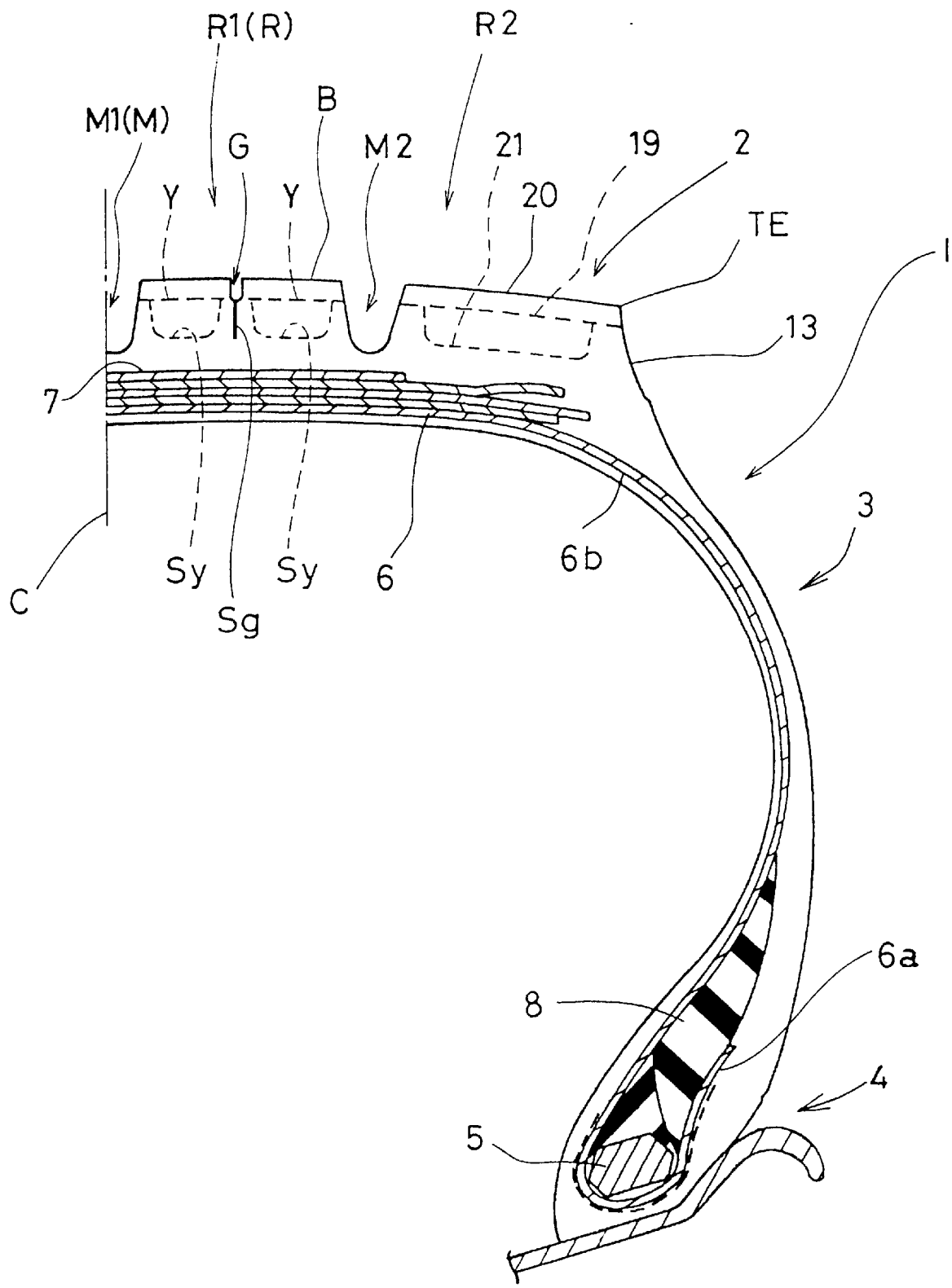
FIG. 1 is a cross sectional view of a tire showing an embodiment of the present invention.

In the figures, the pneumatic tire 1 is an all-weather block pattern radial tire for heavy duty vehicles.

The tire comprises a tread portion 2, a pair of axially spaced bead portions 4 with a bead core 5 therein, a pair of sidewall portions 3 extending radially inwardly from the tread edges TE to the bead portions 4, a toroidal carcass 6 extending between the bead portions 4, and a belt 7 disposed radially outside the carcass 6 and inside the tread portion 2.

The carcass 6 comprises at least one, (in this example, only one) ply of cords arranged radially at an angle of from 90 to 75 degrees with respect to the tire equator C, extending between the bead portions 4 through the tread portion 2 and sidewall portions 3, and turned up around the bead cores 5. The turned up portion 6a of carcass 6 terminates above the bead core 5 and below the tire maximum width position. Between each turned up portion 6a and the main portions 6b of the carcass, a bead apex rubber 8, which extends and tapers radially outwardly from the bead core 5, is disposed to reinforce the bead portion 4.

For the carcass cords, steel cords are used in this example, but organic fiber cords, e.g., polyester, rayon, nylon, and the like may be used. When only organic cords are used, it is preferable to use two or more carcass plies.

The belt 7 comprises a plurality of plies, (in this example, four plies), of parallel cords laid at an angle of from 15 to 80 degrees with respect to the tire equator C. The cord angle and cord inclining direction of each ply differs from the adjacent plies so that the cords are skewed relative to the cords of the adjacent plies.

For the belt cords, steel cords are used in this example, but high modulus organic fiber cords such as aromatic polyamide cords may be used.

The tread portion 2 is provided with at least two circumferential main grooves M extending continuously in a circumferential direction of the tire to divide the tread into at least three rib-like land portions R. At least one of the rib-like land portions R is subdivided into blocks B by at least one circumferential sub-groove G and axial sub-grooves Y.

The main grooves M may be straight or zigzag grooves whose cross sectional area is relatively large. The depth DM of the main grooves M is substantially constant except for partial protrusions formed in the groove bottom J as a tread wear gauge. For example, the groove width WM is 12 to 18 mm, and the groove depth DM is 14 to 20 mm.

The circumferential sub-groove G extends continuously in the tire circumferential direction, and the axial sub-grooves Y extend across the overall width of the land portions R.

The circumferential sub-groove G and the axial sub-grooves Y formed in each land portion R are narrower and shallower than the circumferential main grooves M which are adjacent to the land portion R.

The width Wg and depth Dg of the groove G and the width Wy and depth Dy of the grooves Y are substantially constant along the length thereof the respective grooves. The groove widths Wg and Wy are preferably in the range of from 0.05 to 0.60 times the main groove width WM, (in this example 2 to 5 mm), whereby the number of the blocks and the total edge length are increased to improve the performance on ice and snow without changing the land ratio substantially. If the widths Wg and Wy are more than 0.60 times the width WM, resistance to uneven wear and also steering stability decrease. If the widths Wg and Wy are less than 0.05 times the width WM, drainage is deteriorated and it becomes difficult to make a mold.

When the widths of the two adjacent circumferential main grooves M1 and M2 are different from each other, the widths Wg and Wy of the sub-grooves G and Y therebetween are set in the range of from 0.05 to 0.60 times the average width of the two main grooves M1 and M2.

Figure 2:
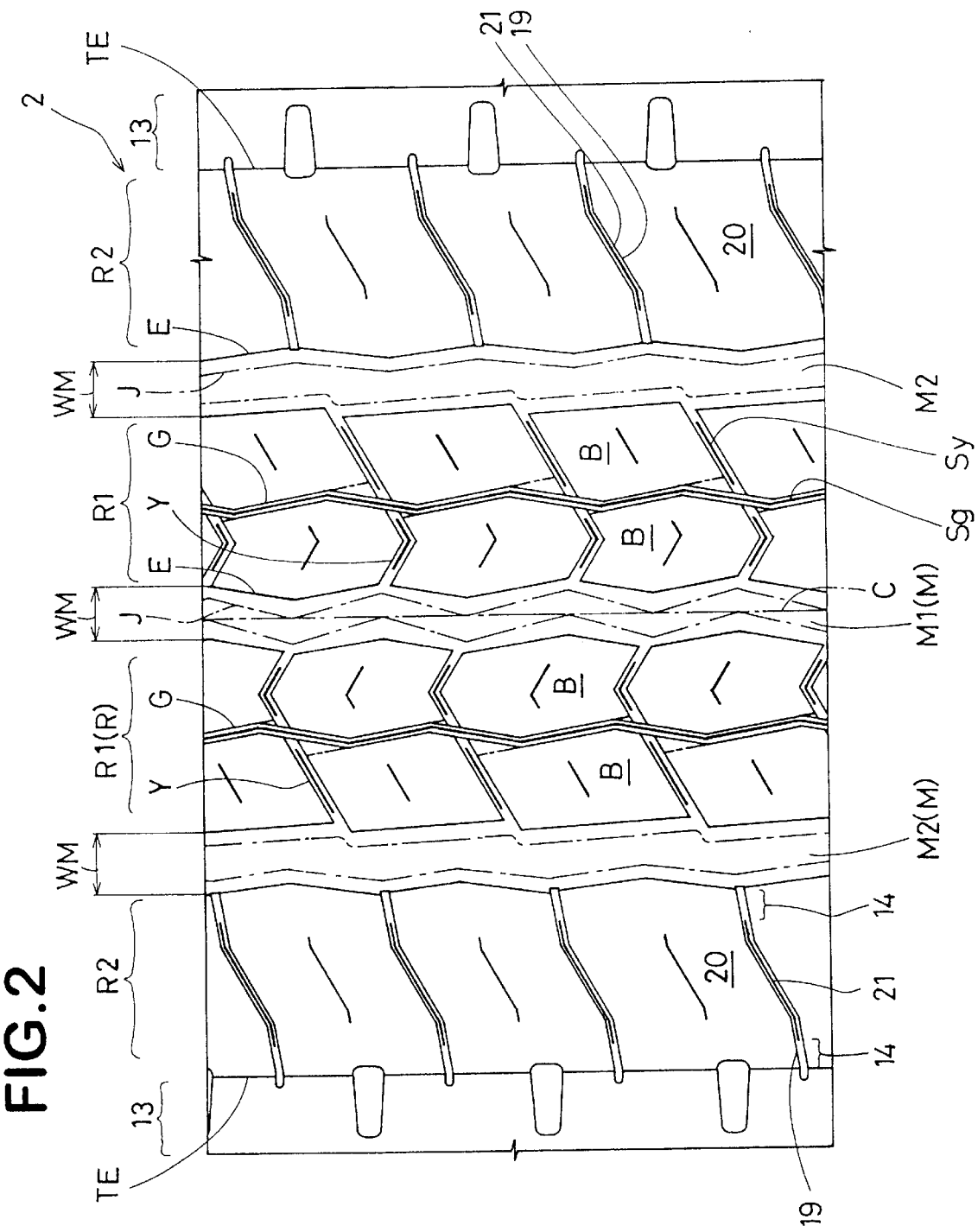
FIG. 2 is a plan view thereof showing an example of the tread pattern.

In FIG. 2, a central main groove M1 is disposed along the tire equator C and a pair of outer main grooves M2 are disposed one on each side of the tire equator C, whereby the tread portion 2 is divided into a pair of inner land portions R1 between the main grooves M1 and M2 and a pair of outer land portions R2 between the main grooves M2 and the tread edges TE.

In each of the axially inner land portions R1, one circumferential sub-groove G and a plurality of axial sub-grooves Y are provided to divide these land portions R1 into two circumferential rows of blocks.

The central main groove M1 has zigzag groove walls of which the zigzag amplitude is gradually decreased from the groove bottom J to the groove top E by changing the inclination angle of the groove walls, whereby uneven wear starting from the zigzag points can be prevented.

The axially outer main grooves M2 also have zigzag groove walls, but the groove walls have different zigzag configurations, and as a result the groove width WM is periodically changed to form narrow width portions along the length of the groove. The average of the maximum width and minimum width is set in the above-mentioned range of from 12 to 18 mm.

The circumferential sub-grooves G are disposed in the axial center of the land portions R1 and extend zigzag at the same zigzag pitches as the circumferential main grooves M1 and M2.

The axial sub-grooves Y are circumferentially arranged at intervals corresponding to the zigzag pitches.

In this example, each circumferential groove G and the axial grooves Y are substantially the same width and the same depth.

In each land portion R1, all the axial sub-grooves Y are bent toward one direction on the axially inside of the sub-groove G, and the angle (alpha) of each sub-groove Y is set in the range of from 20 to 40 degrees with respect to the axial direction of the tire.

An acute angled corner 10 of the block B formed between the circumferential sub-groove G and the axial sub-grooves Y is cut by a gentle slope 11 of which upper edge aligns with the edge of the adjacent zigzag groove segment, thereby preventing the block from being torn off. The above-mentioned widths Wg and Wy are of the main part, excepting this slopped part 11, which is wider. It is also possible to use a steep slope instead of the gentle slope 11 so that the widened part has the substantially same depth as the sub-groove depth Dg and Dy.

According to the invention, the circumferential sub-groove G is provided in the groove bottom with a circumferential sipe Sg extending continuously in the tire circumferential direction along the groove center line. Additionally, each of the axial sub-groove Y is provided in the groove bottom with axial sipes Sy extending along the groove center line.

In the example in FIG. 2, therefore, the circumferential sipe Sg has a zigzag configuration, and the axial sipes Sy are inclined at the above-mentioned angle (alpha).

The axial sipes Sy do not intersect the circumferential sub-groove G and the circumferential sipe Sg therein, and the axial sipes Sy terminate near the circumferential sipe Sg and within the bottom of the axial sub-grooves Y.

In the example in FIG. 2, the axial sipes Sy do not intersect the circumferential main grooves M1 and M2 and do not open in the buttress portion 13, and the axial sipes Sy terminate within the bottom of the axial sub-grooves Y. Thus, the ends e1 and e2 of each axial sipe Sy are spaced apart from the circumferential grooves M, G or the tread edge TE by a definite space 12 or 14. Here, the buttress 13 is the axially outside part of the tread portion 2 extending from the tread edge TE towards the sidewall portion 3.

By the provision of the sipes Sg and Sy, an excessive decrease in rigidity of the blocks B defined by the sub-grooves G and Y can be controlled, thereby controlling a decrease in the steering stability on dry paved roads (dry running performance) and uneven wear resistance. Thus, high performance can be obtained under wet, snow, or icy conditions.

Here, the sipes Sg and Sy have a width of from 0.3 to 1.5 mm, and preferably not more than 1.0 mm. The sipes Sg and Sy may be closed by ground contacting pressure so as to maintain block rigidity. If the sipe width is less than 0.3 mm, it becomes difficult to form such thin sipe. If the sipe width is more than 1.5 mm, block rigidity decreases, deteriorating dry running performance, uneven wear resistance, block tear resistance, and the like.

Figure 3:
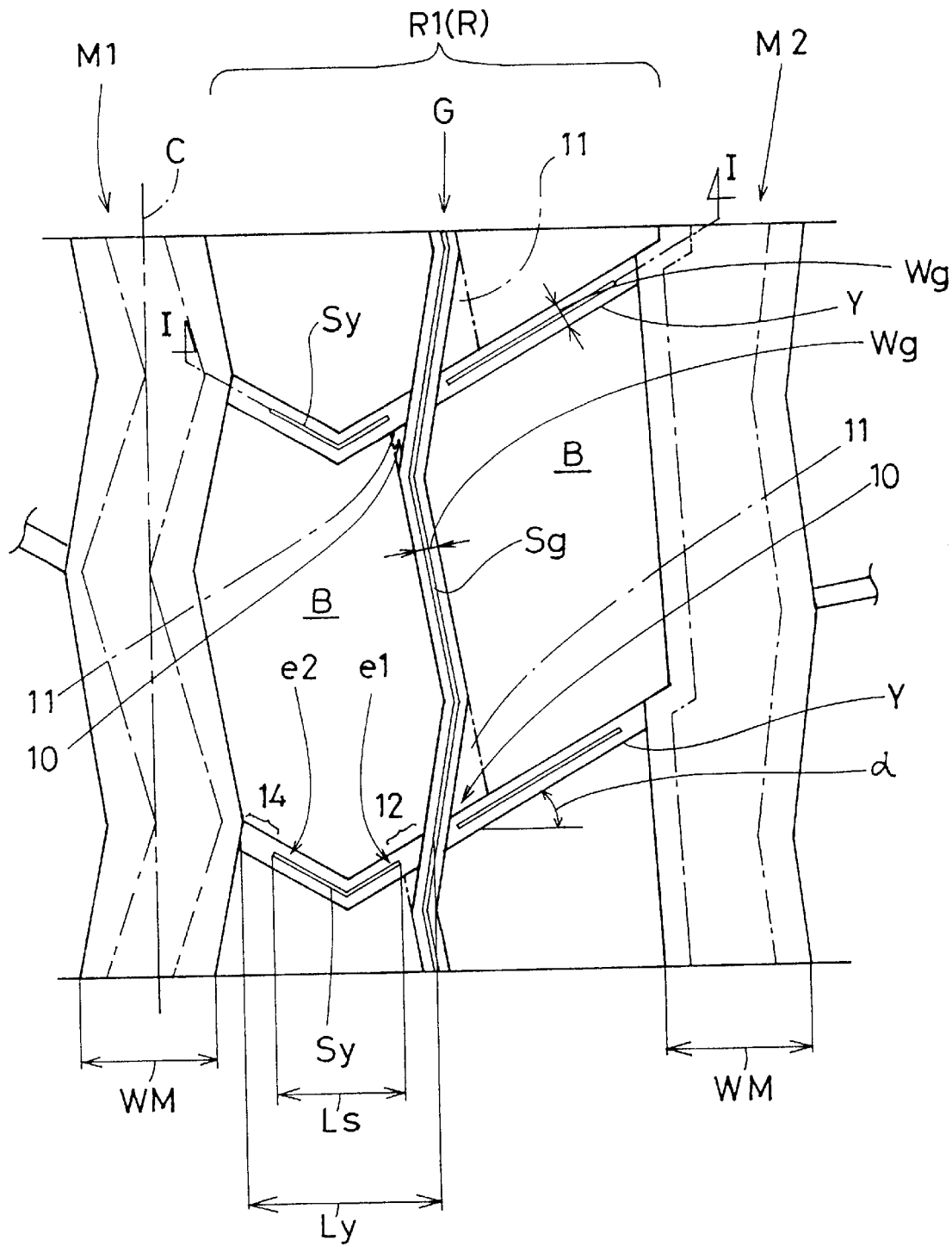
FIG. 3 is an enlarged plan view showing a rib-like land portion provided with sub-grooves.

As shown in FIG. 3, the axial length Ls of each axial sipe Sy measured between the ends e1 and e2 thereof is in the range of from 0.3 to 0.9 times the axial length Ly measured on the center line of the axial sub-groove Y between the circumferential sipe Sg and the axial sub-groove end opened at the circumferential main groove M or the buttress 13. If the axial length Ls is less than 0.3 times the axial length Ly, performance and in snowy, icy, or wet conditions can not be fully improved. Preferably, the axial length Ls is not less than 0.5 times the axial length Ly. If the axial length Ls is more than 0.9 times the axial length Ly, the parts 12 and 14 between the sipe ends and the circumferential grooves M and G become overloaded, and cracks are liable to occur in the sipe bottom. Preferably, the axial length Ls is not more than 0.8 times the axial length Ly.

Figure 4:
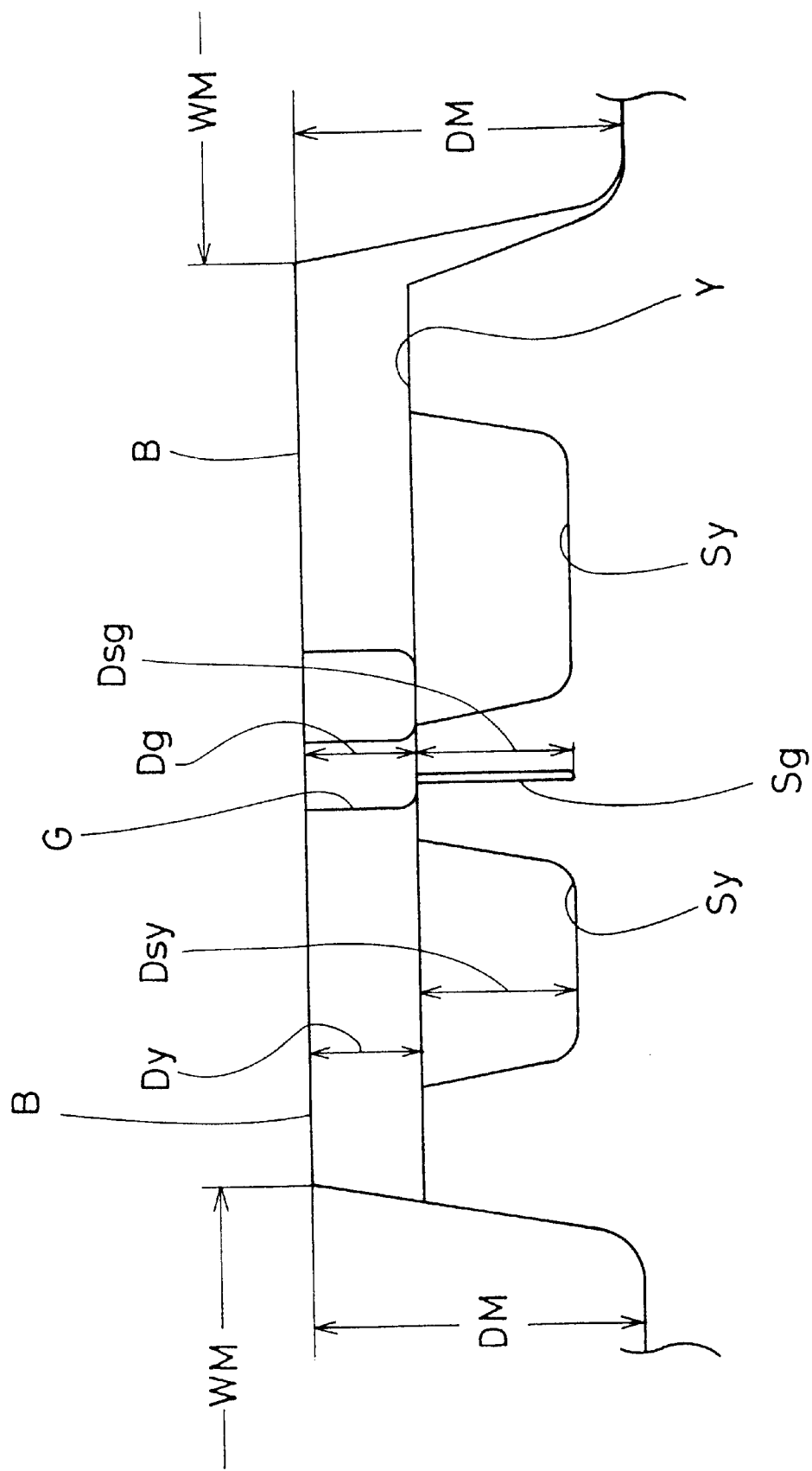
FIG. 4 is a cross sectional view taken along a line I—I in FIG. 3.

As shown in FIG. 4, the sum (Dsg+Dg) of the depth Dsg of the circumferential sipe Sg and the depth Dg of the circumferential sub-groove G is preferably in the range of from 0.5 to 1.0 times the depth DM of the main groove M. If the sum (Dsg+Dg) is more than 1.0 times, the rubber thickness under the sipe decreases, and cracks are liable to occur in the sipe bottom. If the sum is less than 0.5 times, performance in snowy, icy, and wet conditions becomes poor in the later stages of tire life. More preferably, the upper limit is 0.9 times the depth DM, and the lower limit is 0.6 times the depth DM.

Additionally, the ratio Dg/(Dsg+Dg) is preferably 0.2 to 0.6. If more than 0.6, pattern rigidity becomes insufficient, and block tear and uneven wear are liable to occur. If less than 0.2, wet performance decreases in the initial stage of wear life. More preferably, the lower limit is 0.3, and the upper limit is 0.5.

For the same reasons, the sum (Dsy+Dy) of the depth Dsy of the axial sipe Sy and the depth Dy of the axial sub-groove Y is preferably in the range of from 0.5 to 1.0 times the depth DM of the main groove M. Additionally, the ratio Dy/(Dsy+Dy) is preferably 0.2 to 0.6.

In this example, the circumferential main grooves M adjacent to one land portion R are the substantially same depth DM. However, the depths may differ. When the depths are different, the average thereof may be used as the above-mentioned depth DM. Further, the depth Dsg of the sipe G is substantially the same as the depth Dsy of the sipe Y.

In the example shown in FIG. 2, the axially outer land portions R2 are not provided with a circumferential sub-groove like sub-groove G, but axial sub-grooves 19 are disposed at the substantially same intervals as the axial sub-grooves Y. Thus, the land portions R2 are divided into relatively large blocks 20, whereby, a sufficient cornering force may be obtained during cornering. Each of the axial sub-grooves 19 is provided at its bottom with an axial sipe 21 having ends terminating within the bottom, leaving a space 14. The axial sub-grooves 19 and the axial sipes 21 have the substantially same construction as the axial sub-grooves Y and the axial sipes Sy, respectively.

For example, as shown in the tread pattern (A) in FIG. 5, if the axial sipes Sy intersect the circumferential sipe Sg and all the ends are opened to the circumferential main groove M or in the buttress portion 13, the block rigidity greatly decreases and the dry running performance and uneven wear resistance decrease. Further, block tear and cracks in the bottom of the axial sipes Sy are liable to occur during of acceleration and braking. As shown in the tread pattern (B) in FIG. 5, if the axial sipes Sy intersect the circumferential sipe Sg but the ends near the main grooves M are closed, the above-mentioned problems in the pattern (A) are somewhat solved. However, the corners 15 of the blocks are greatly decreased in rigidity than other parts and rubber tearing is liable to occur. As shown in the tread pattern (C) in FIG. 5, if the axial sipes Sy and circumferential sipe Sg break before crossing at the intersection of the narrow grooves G and Y, the block rigidity increases to unfavorably decrease the lateral grip on wet roads, and especially snowy/icy roads especially. As shown in the tread pattern (D) in FIG. 5, if the circumferential sipe Sg breaks before the crossing points but the axial sipes Sy extend continuously across the crossing points, block tear and cracks in the bottom of the axial sipes Sy are liable to be caused by large stresses during braking and acceleration.

In the present invention, therefore, the circumferential sipes Sg extend continuously but the axial sipes Sy break before the crossing points. Therefore, the axial sipes Sy do not intersect the circumferential sipe Sg, and cracks in the bottom of the axial sipes and block tears can be controlled. As the stress in the lateral direction occurring during cornering is relatively small in comparison with the stress in the circumferential direction occurring during braking and acceleration, cracks hardly occur in the bottom of the circumferential sipe Sg. Thus, durability depending on the block tear and cracks, dry running performance, uneven wear resistance, on-the-snow/ice performance, and wet performance can be compatible with each other.

In this example, block tear and cracks in the sipe bottom are further controlled as the axial sipes Sy terminate before the main grooves M.

Figure 6:
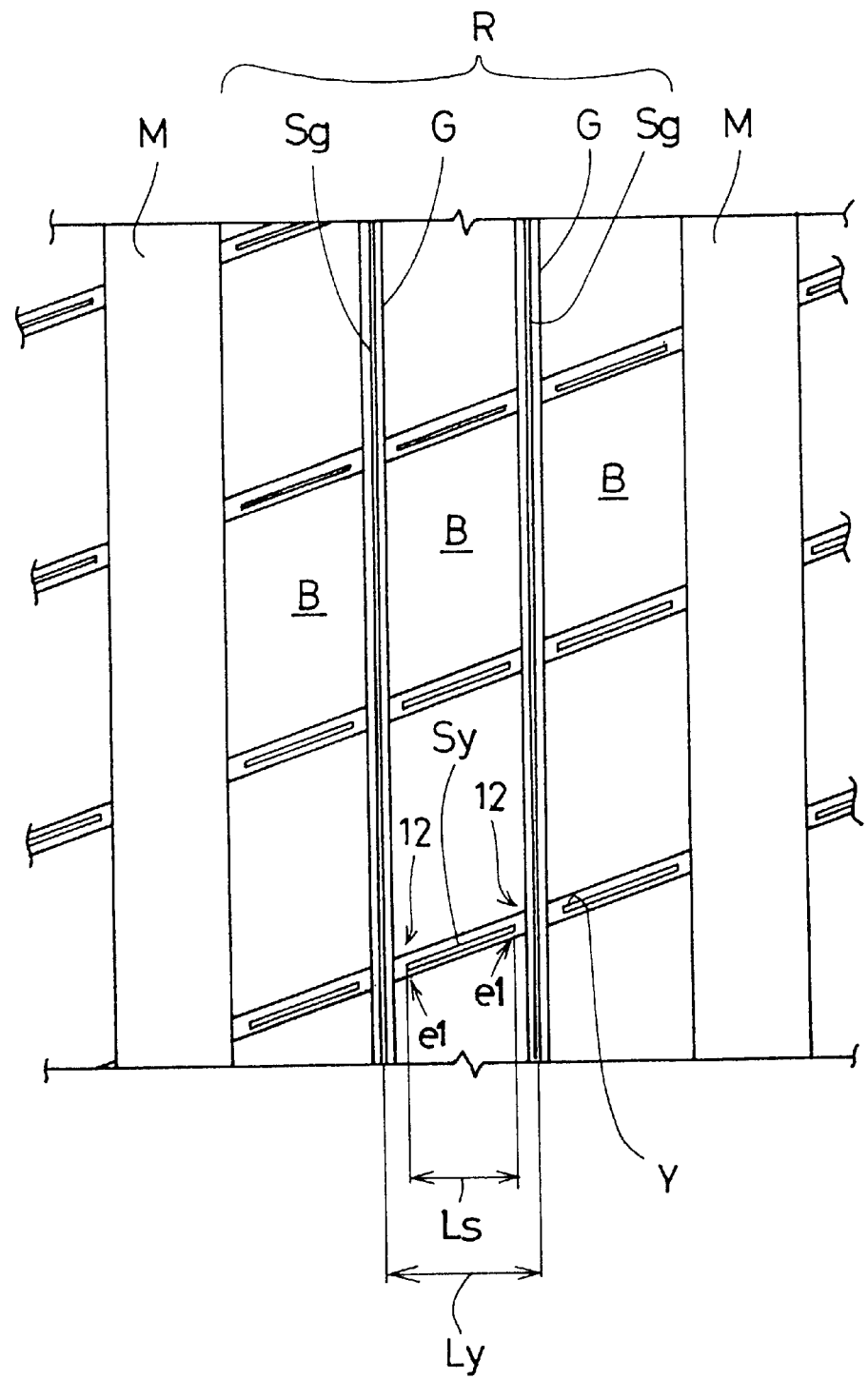
FIG. 6 is a plan view showing another example of the tread pattern.

FIG. 6 shows another example of the tread portion, wherein a plurality of circumferential sub-grooves G are disposed in a land portion R. The sipes Sy in the axial sub-grooves Y between the circumferential sub-grooves G terminate before the circumferential grooves G so as to not intersect the circumferential sipes Sg. The axial length Ls of the sipes Sy measured between the sipe ends is preferably in the range of from 0.3 to 0.9 times the axial length Ly measured on the center line of the axial sub-groove Y between the centers of the circumferential sipes Sg.

In the present invention, at least one land portion R is provided with the circumferential sub-groove G and axial sub-grooves Y with the sipes Sg and Sy to be divided into blocks B. Thus, the remaining land portions R may be formed as a circumferentially continuous rib without the sub-groove and/or a row of other types of blocks.

Comparison Test

Test tires of size 295/80R22.5 were made and tested for the durability and wet performance as follows. The test tires had the same structure shown in FIG. 1.

| Carcass | |
| --- | --- |
| No. of ply | 1 |
| Cord material | steel |
| Cord angle | 90° |
| Belt | |
| No. of ply | 4 |
| Cord material | steel |
| Cord angle | −50°/−18°/18°/18° |
| | (radially inside to outside) |
| Ply width (mm) | 190/216/196/90 |
| | (radially inside to outside) |

A) Durability test

The test tires were mounted on all the wheels of a 20-ton truck (22-D wheel type), and after running for 50,000 km (dry paved road=80%, wet paved road=20%), the tread portion was checked if damage such as block tearing-off and the like occurred. The results are shown in Table 1.

Rim size: 9.0×22.5 (JATMA standard)

Pressure: 8.5 kg/sq.cm (JATMA standard)

B) Wet performance test

Running a test truck provided on all the wheels with test tires in a test course (wet paved road), the steering stability was evaluated into five ranks by a test driver's feeling. The evaluation was made under a new tire condition (0% wear) and a worn condition (50% wear). The larger the point, the better the wet performance.

TABLE 1

| Tire 1 | Ref.1 | Ref.2 | Ref.3 | Ref.4 | Ex.1 |
| --- | --- | --- | --- | --- | --- |
| Tread pattern | FIG.5(A) | FIG.5(B) | FIG.5(C) | FIG.5(D) | FIG.2 |
| Depth | | | | | |
| Main groove DM (mm) | 16 | 16 | 16 | 16 | 16 |
| Sub-groove Dg = Dy (mm) | 5 | 5 | 5 | 5 | 5 |
| Sipe Dsg = Dsy (mm) | 8.5 | 8.5 | 8.5 | 8.5 | 8.5 |

TABLE 1-continued

| Tire 1<br>Tread pattern | Ref.1<br>FIG.5(A) | Ref.2<br>FIG.5(B) | Ref.3<br>FIG.5(C) | Ref.4<br>FIG.5(D) | Ex.1<br>FIG.2 |
|---|---|---|---|---|---|
| Wet performance | | | | | |
| 0% wear | 3 | 3 | 2 | 2 | 3 |
| 50% wear | 3 | 3 | 2 | 2 | 3 |
| Durability *2 | *1<br>(18 mm) | *1<br>(8 mm) | no<br>damage | *1<br>(3 mm) | no<br>damage |

*1 The blocks facing the axial sub-grooves were torn off.
*2 In the parentheses, the maximum size of the torn-off part measured in the tire circumferential direction is shown.

The present invention can be suitably applied to all-weather pneumatic tires for heavy duty vehicles. However, the present invention can be applied to other types of tire such as summer tire and the like for various types of vehicles such as heavy duty vehicles, passenger car and the like.

I claim:

1. A pneumatic tire comprising a tread portion,
   said tread portion being provided with at least two main grooves extending circumferentially about the tire to axially divide said tread portion into at least three land portions,
   at least one of said three land portions being provided with sub-grooves shallower in depth than said at least two main grooves M,
   said sub-grooves comprising axial sub-grooves Y extending across said at least one land portion and a circumferential sub-groove G extending continuously in the circumferential direction of the tire,
   a width Wg of the circumferential sub-groove being in the range of from 0.05 to 0.60 times a width WM of one of said main grooves,
   a width Wy of the axial sub-grooves being in the range of from 0.05 to 0.60 times said width WM of said one of said main groove,
   said circumferential sub-groove being provided at the bottom thereof with a circumferential sipe Sg extending continuously in the circumferential direction of the tire,
   each of said axial sub-grooves being provided in the bottom thereof with an axial sipe Sy on opposite sides of said circumferential sub-groove,
   each said axial sipe having a first end adjacent said circumferential sub-groove and a second end,
   wherein said first end does not intersect said circumferential sipe and is closed within the groove bottom.

2. The pneumatic tire according to claim 1, wherein said second end is closed within the groove bottom.

3. The pneumatic tire according to claim 1, wherein said widths Wg and Wy of said circumferential sub-groove and axial sub-groove, respectively, are 2 to 5 mm.

4. The pneumatic tire according to claim 1, wherein said circumferential sub-groove G and said axial sub-grooves Y have substantially the same width and the same depth.

5. The pneumatic tire according to claim 1, wherein a sum (Dg+Dsg) of a depth Dg of said circumferential sub-groove G and a depth Dsg of said circumferential sipe Sg is in the range of from 0.5 to 1.0 times a depth DM of the main grooves M, and the ratio Dg/(Dsg+Dg) is in the range of from 0.2 to 0.6, and
   the sum (Dy+Dsy) of a depth Dy of the axial sub-grooves Y and a depth Dsy of said axial sipes Sy is in the range of from 0.5 to 1.0 times said depth DM of the main grooves M, and the ratio Dy/(Dsy+Dy) is in the range of from 0.2 to 0.6.

6. The pneumatic tire according to claim 1, wherein all of said axial sub-grooves Y in each land portion which are axially inside the circumferential sub-groove G are bent toward one direction, and an angle of each said sub-groove Y which is between the circumferential sub-groove G and a main groove M is in the range of from 20 to 40 degrees with respect to the axial direction of the tire.

7. The pneumatic tire according to claim 1, wherein all said axial sub-grooves Y in each land portion are straight grooves inclined at an angle in one direction, and the angle of each said sub-groove Y is in the range of from 20 to 40 degrees with respect to the axial direction of the tire.

8. The pneumatic tire according to claim 1, wherein said at least two main grooves comprise a central main groove M1 disposed in the center of the tread portion and a pair of outer main grooves M2 disposed on respective sides of said central main groove M1.

9. The pneumatic tire according to claim 8, wherein said central main groove M1 has zigzag groove walls of which the zigzag amplitude is gradually decreased from the groove bottom to the groove top.

10. The pneumatic tire according to claim 8, wherein each said outer main groove M2 has zigzag groove walls having different zigzag configurations so that a width WM of each outer main groove M2 changes periodically along the length thereof.

11. The pneumatic tire according to claim 8, wherein each of the land portions between the outer main grooves M2 is provided with said circumferential sub-groove and axial sub-grooves, and
    axially outer land portions R2 are provided with axial sub-grooves, but not provided with said circumferential sub-groove.

* * * * *

UNITED STATES PATENT AND TRADEMARK OFFICE
CERTIFICATE OF CORRECTION

PATENT NO. : 5,909,756
DATED : June 8, 1999
INVENTOR(S) : Tatsuya MIYAZAKI

It is certified that error appears in the above-identified patent and that said Letters Patent is hereby corrected as shown below:

The Title page should be deleted to appear as per attached Title page.

Signed and Sealed this

Thirtieth Day of November, 1999

Attest:

*Attesting Officer*

Q. TODD DICKINSON

*Acting Commissioner of Patents and Trademarks*

United States Patent [19]
Miyazaki

[11] Patent Number: 5,909,756
[45] Date of Patent: Jun. 8, 1999

[54] PNEUMATIC TIRE INCLUDING SUB-GROOVES

[75] Inventor: Tatsuya Miyazaki, Akashi, Japan

[73] Assignee: Sumitomo Rubber Industries, Ltd., Hyogo-ken, Japan

[21] Appl. No.: 08/931,755

[22] Filed: Sep. 16, 1997

[30] Foreign Application Priority Data

Sep. 16, 1996 [JP] Japan .................. 8-248176

[51] Int. Cl.⁶ .................. B60C 11/11; B60C 11/12; B60C 11/13
[52] U.S. Cl. .................. 152/209 R; 152/DIG. 3
[58] Field of Search .................. 152/209 R, 209 D, 152/DIG. 3, 209 A

[56] References Cited

U.S. PATENT DOCUMENTS

| | | | |
|---|---|---|---|
| 3,789,898 | 2/1974 | Montagne | 152/209 R |
| 4,258,769 | 3/1981 | Makino et al. | 152/209 R |
| 4,296,789 | 10/1981 | Roberts et al. | 152/209 R |

FOREIGN PATENT DOCUMENTS

| | | | |
|---|---|---|---|
| 2084741 | 6/1993 | Canada | 152/209 R |
| 348335 | 12/1989 | European Pat. Off. | 152/209 R |

Primary Examiner—Steven D. Maki

[57] ABSTRACT

A pneumatic tire comprises a tread portion divided into at least three land portions by at least two circumferential main grooves, and at least one of the three land portions is provided with sub-grooves being shallower in depth than the main grooves and having a width in the range of from 0.05 to 0.60 times the width of the main grooves. The sub-grooves comprises axial sub-grooves extending across the land portion and a circumferential sub-groove extending continuously in the circumferential direction of the tire. The circumferential sub-groove is provided in the bottom with a circumferential sipe extending continuously in the circumferential direction of the tire. Each of the axial sub-grooves is provided in the groove bottom on each side of the circumferential sub-groove with an axial sipe extending along the longitudinal direction thereof. The axial sipe has a first end on the circumferential sub-groove side and a second end on another side, the first end not intersecting the circumferential sipe and closed within the groove bottom, and the second end preferably closed within the groove bottom.

11 Claims, 6 Drawing Sheets

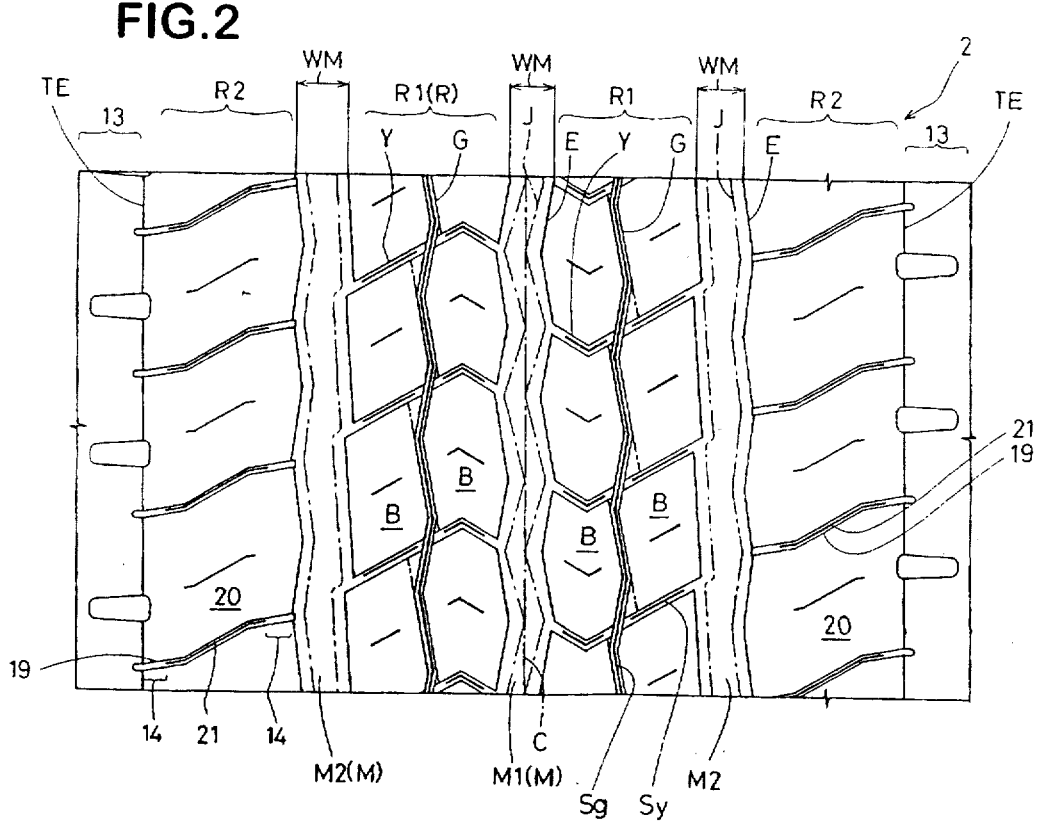

FIG.2